(12) United States Patent
Malkamäki et al.

(10) Patent No.: US 10,390,271 B2
(45) Date of Patent: Aug. 20, 2019

(54) INDICATION OF TDM EXTENSION PATTERN FOR DUAL CONNECTIVITY

(71) Applicant: Nokia Technologies Oy, Espoo (FI)

(72) Inventors: Esa Mikael Malkamäki, Espoo (FI); Jari Petteri Lunden, Espoo (FI); Elena Virtej, Espoo (FI); Martti Johannes Moisio, Klaukkala (FI)

(73) Assignee: Nokia Technologies Oy, Espoo (FI)

( * ) Notice: Subject to any disclaimer, the term of this patent is extended or adjusted under 35 U.S.C. 154(b) by 25 days.

(21) Appl. No.: 14/787,633

(22) PCT Filed: May 20, 2013

(86) PCT No.: PCT/US2013/041900
§ 371 (c)(1),
(2) Date: Oct. 28, 2015

(87) PCT Pub. No.: WO2014/189490
PCT Pub. Date: Nov. 27, 2014

(65) Prior Publication Data
US 2016/0112913 A1  Apr. 21, 2016

(51) Int. Cl.
*H04L 5/00* (2006.01)
*H04L 5/22* (2006.01)
(Continued)

(52) U.S. Cl.
CPC .......... *H04W 36/04* (2013.01); *H04L 5/0048* (2013.01); *H04L 5/22* (2013.01); *H04W 16/32* (2013.01);
(Continued)

(58) Field of Classification Search
CPC . H04W 36/04; H04W 16/32; H04W 36/0055; H04W 76/048; H04W 76/025; H04L 5/0048; H04L 5/22; H04L 5/001
(Continued)

(56) References Cited

U.S. PATENT DOCUMENTS

2008/0189970 A1* 8/2008 Wang ............... H04W 36/0055
33/701
2009/0052392 A1* 2/2009 Sumasu ............... H04W 36/02
370/331
(Continued)

FOREIGN PATENT DOCUMENTS

| EP | 1944985 | 7/2008 |
|----|---------|--------|
| WO | 2008085952 | 7/2008 |

(Continued)

OTHER PUBLICATIONS

International Search Report and Written Opinion received for corresponding Patent Cooperation Treaty Application No. PCT/US2013/041900, dated Jan. 27, 2014, 11 pages.
(Continued)

*Primary Examiner* — Shahriar Behnamian
(74) *Attorney, Agent, or Firm* — Mintz Levin Cohn Ferris Glovsky and Popeo, P.C.

(57) ABSTRACT

Methods and apparatus, including computer program products, are provided for dual connectivity. In one aspect there is provided a method. The method may include switching, by a user equipment, between a first carrier associated with a first base station and a second carrier associated with a second base station, wherein the switching is performed based on at least a configuration defining when to perform the switching; and indicate an extension of a time allocated by the configuration at the first base station. Related apparatus, systems, methods, and articles are also described.

18 Claims, 8 Drawing Sheets

(51) Int. Cl.
*H04W 16/32* (2009.01)
*H04W 36/00* (2009.01)
*H04W 36/04* (2009.01)
*H04W 76/15* (2018.01)

(52) U.S. Cl.
CPC ... *H04W 36/0055* (2013.01); *H04W 36/0069* (2018.08); *H04L 5/001* (2013.01); *H04W 76/15* (2018.02)

(58) Field of Classification Search
USPC .......................................................... 455/444
See application file for complete search history.

(56) References Cited

U.S. PATENT DOCUMENTS

| | | | |
|---|---|---|---|
| 2011/0281570 A1* | 11/2011 | Shi | H04W 24/10 455/418 |
| 2012/0064903 A1* | 3/2012 | Pani | H04W 36/0088 455/450 |
| 2012/0281563 A1* | 11/2012 | Comsa | H04W 24/10 370/252 |
| 2013/0322235 A1* | 12/2013 | Khoryaev | H04W 24/10 370/229 |
| 2014/0219251 A1* | 8/2014 | Kato | H04W 36/023 370/331 |
| 2016/0088609 A1* | 3/2016 | Zhang | H04W 72/0413 370/329 |

FOREIGN PATENT DOCUMENTS

| | | |
|---|---|---|
| WO | 2011160009 | 12/2011 |
| WO | 2012061765 | 5/2012 |

OTHER PUBLICATIONS

3GPP, "Technical Specification Group Radio Access Network; Evolved Universal Terrestrial Radio Access (E-UTRA); Physical layer; Measurements (Release 11)," 3rd Generation Partnership Project, 3GPP TS 36.214 V11.1.0, Dec. 2012.

3GPP, "Technical Specification Group Radio Access Network; Evolved Universal Terrestrial Radio Access (E-UTRA); LTE physical layer; General description (Release 11)," 3rd Generation Partnership Project, 3GPP TS 36.201 V11.1.0, Dec. 2012.

3GPP, "Technical Specification Group Radio Access Network; Evolved Universal Terrestrial Radio Access (E-UTRA); Medium Access Control (MAC) protocol specification (Release 11)," 3rd Generation Partnership Project, 3GPP TS 36.321 V11.2.0, Mar. 2013.

3GPP, "Technical Specification Group Radio Access Network; Evolved Universal Terrestrial Radio Access (E-UTRA); Multiplexing and channel coding (Release 11)," 3rd Generation Partnership Project, 3GPP TS 36.212 V11.2.0, Feb. 2013.

3GPP, "Technical Specification Group Radio Access Network; Evolved Universal Terrestrial Radio Access (E-UTRA); Physical Channels and Modulation (Release 11)," 3rd Generation Partnership Project, 3GPP TS 36.211 V11.2.0, Feb. 2013.

3GPP, "Technical Specification Group Radio Access Network; Evolved Universal Terrestrial Radio Access (E-UTRA); Physical layer procedures (Release 11)," 3rd Generation Partnership Project, 3GPP TS 36.213 V11.2.0, Feb. 2013.

* cited by examiner

600

Switching between a first carrier associated with a first base station and a second carrier associated with a second base station, wherein the switching is performed based on at least a configuration defining when to perform the switching — 610

Indicating a request/indication for extending a time allocated by the configuration at the first base station. — 620

FIG. 6

INDICATION OF TDM EXTENSION PATTERN FOR DUAL CONNECTIVITY

RELATED APPLICATION

This application was originally filed as PCT Application No. PCT/US2013/041900 filed May 20, 2013.

FIELD

The subject matter described herein relates to wireless communications and, in particular, mobility.

BACKGROUND

A user equipment, such as a smartphone or other wireless device, may implement dual connectivity using for example two radios, in which a first radio accesses a first of the two simultaneous connections and a second radio accesses the second of the two simultaneous connections. However, the user equipment may also implement a single radio to access the two connections. In the single radio case, the user equipment may have a single radio frequency (RF) chain for receive or transmit, so dual connectivity may be implemented using time domain multiplexing (TDM). This TDM approach may comprise a TDM pattern defining when a user equipment switches between two wireless access points. For example, the user equipment may switch its radio, based on a TDM pattern, to access a first carrier from a first base station serving a cell, such as a macrocell or a carrier aggregation primary cell (PCell), and a second carrier from a second base station serving another cell, such as small cell or a carrier aggregation secondary cell (SCell).

SUMMARY

Methods and apparatus, including computer program products, are provided for dual connectivity.

In some example embodiments, there is provided a method. The method may include switching, by a user equipment, between a first carrier associated with a first base station and a second carrier associated with a second base station, wherein the switching is performed based on at least a configuration defining when to perform the switching; and indicating an extension of a time allocated by the configuration at the first base station.

In some variations, one or more of the features disclosed herein including the following features can optionally be included in any feasible combination. The first base station may provide at least one of a primary cell, a macrocell, or an anchor cell, and the second base station may provide at least one of a small cell, a secondary cell, or an assisting cell. The user equipment may access the first carrier and the second carrier using a single transceiver. The indicating may further comprise sending, by the first base station, the request/indication to at least the second base station. The indicating may further comprise sending, by the user equipment, the request/indication to at least the second base station. The user equipment may access the second carrier to send the request/indication to the second base station and then resume access to the first carrier. The request/indication may be indicated by the user equipment continuing to receive the first carrier at the first base despite the configuration directing the user equipment to return to the second base station. The request/indication may be indicated by the user equipment failing to provide the second base station with an expected response in accordance with the configuration, wherein the expected response includes at least one of a channel quality indictor, a sounding reference signal transmission, a response to a hybrid automatic repeat request retransmission, or a response to an uplink grant. The request/indication may be sent, when at least one of a transmission from the first base station has failed or the first base station has additional information to transmit to, or receive from, the user equipment.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIG. 6 depicts an example process for providing an indication of dual connectivity, in accordance with some exemplary embodiments;

Figure 1:
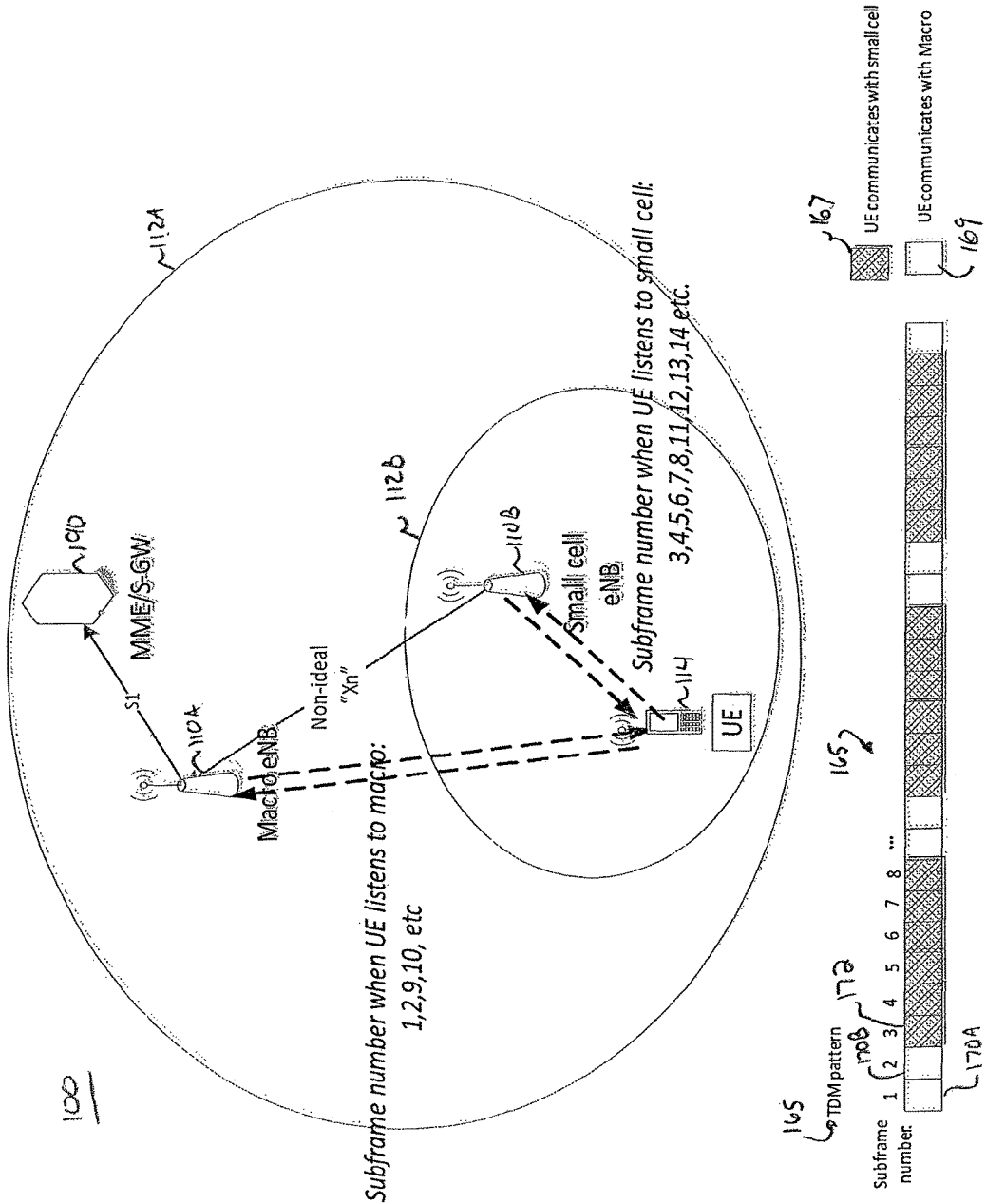
FIGS. 1-4 depict examples of systems configured for dual connectivity, in accordance with some exemplary embodiments.

Like labels are used to refer to same or similar items in the drawings.

DETAILED DESCRIPTION

FIG. 1 depicts an example system 100 including a user equipment 114, one or more wireless access points, such as such as an evolve node B (eNB) base station 110A serving macrocell 112A (which may also be referred to as an anchoring eNB or a master eNB) and another base station (can also be called an assisting eNB or a slave eNB) serving a small cell 112B, although other types of cells and base stations may be used as well including PCells, SCells, and/or the like. The system 100 may further include network nodes, such as a mobility management entity or a serving gateway 190 coupled via one or more backhaul links to eNB base station 110A (also referred to herein as macro base station 110A) and/or to eNB base station 110B. It should be noted that calling the first base station as macro cell eNB or anchoring eNB or master eNB or primary (cell) eNB and calling second base station as small cell eNB or assisting eNB or slave eNB or secondary (cell) eNB are just examples. Thus the cell served by the first base station may have the same size as the cell served by the second base station or the first cell may be even larger than the second cell.

In the example of FIG. 1, user equipment 114 may use a single radio, such as a single RF receive and/or transmit chain, to access the dual connections by switching the single radio between a first carrier associated with macro base station 110A and a second carrier associated with base station 110B (also referred to herein as a small cell base station), although the switching may be performed between other types of cells as well.

In some example embodiments, user equipment 114 may implement a TDM pattern 165 defining when the user equipment 114 can have communication with the small cell base station 110B (for example, as indicated by the shaded portions 167). The TDM pattern 165 may also define when user equipment 114 can have communication with the macro base station 110A (for example, as indicated by the unshaded portions 169). For example, the TDM pattern 165 may define that user equipment 114 can communicate (for example, receive, listen, access, measure, and/or the like) with macro base station 110A 5 millisecond (ms) out of every 80 ms, so user equipment 114 has a 6 subframe gap at small cell base station 110B to communicate with/receive from/listen to macro base station 110A, although other patterns may be used as well. Indeed, the TDM pattern 165 shows an example TDM pattern in which user equipment 114 may communicate with macro base station 110A every 2 ms out of every 8 ms even though in practice less frequent pattern may be used as well. This is in some respect like a DRX pattern between the macro and small cell indicating the user equipment when to receive/monitor the PDCCH in macrocell and when in small cell. To illustrate further, user equipment 114 may, during the 2 ms gap, communicate with a physical downlink control channel (PDCCH) transmitted by macro base station 110A. After listening to the PDCCH, user equipment 114 may then switch its radio to communicate with small cell base station 110B.

In the example of FIG. 1, user equipment 114 may be primarily served by small cell base station 110B. For example, user equipment 14 may receive from macro base station 110A about every 5-6 ms out of about every 80 ms frame. During this 6 ms gap, user equipment 114 may receive, via the single radio at user equipment 114, the PDCCH scheduling control information, a data transmission, and/or any other information. During this 6 ms gap, user equipment 114 may, however, fail to decode the transmission from macro base station 110A. Thus, there would be a need for re-transmission from macro, but the user equipment may need to return to receive from the small cell. As such, user equipment 114 may need additional time to successfully receive/listen to the retransmission from macro base station 110A. But the TDM pattern may require user equipment 114 to switch back to the second cell, such as small base station 110B, despite the user equipment's need to remain listening to macro base station 110A in order to receive the retransmission from macro base station 110A. In this example, user equipment 114 may need an extension to the time defined by the TDM pattern in order to listen to a cell, such as macrocell 112A including macro base station 110A, but the user equipment 114 cannot due to the TDM pattern requiring a switch to small base station 110B including small cell (or SCell) 112B.

In some example embodiments, the subject matter disclosed herein may relate to extending the time a user equipment is allowed to remain in communication with a cell or base station. In case user equipment 114 needs a re-transmission from the macrocell/base station after initial transmission has failed or if macrocell/base station eNB has additional information (for example, data/signaling) to be sent to the user equipment 114, the TDM pattern is extended in order to avoid long delays in reception of retransmissions (of potentially important control information). This extension of the TDM pattern may need to be communicated to the small cell/base station so that it knows that user equipment 114 is going to continue receiving macro and thus is not able to communicate with the small cell. For example, a TDM pattern may define when a user equipment switches communications between a first cell (for example, a macrocell, a PCell, or an anchoring cell) including a base station 110A (which may be configured as a macro base station) and a second cell (for example, a small cell or, for example, an SCell or an assisting cell) including a base station 110B (which may be configured as a small cell base station). When user equipment 114 needs an extension to the TDM pattern to provide more time to the user equipment to access a given cell (for example, to receive a re-transmission from macro base station 110A), the subject matter disclosed herein may, in some example embodiments, extend the user equipment's access, which may avoid long delays in the reception of retransmissions from macro base station 110A.

Although the previous example describes user equipment 114 needing a TDM extension in order to receive a retransmission, user equipment 114 may need additional time for other reasons as well including when macro eNB base station 110A has additional data/signaling to be sent to the user equipment 114.

In some example embodiments, the TDM pattern extension may be signaled to the small base station 110B. This signaling may inform small cell base station 110B, so that the small cell base station 110B knows that user equipment 114 is going to continue to listen to, receive from, and the like macro base station 110A. As a result, user equipment 114 will not able to communicate with the small base station 110B including small cell 112B.

In some example embodiments, this extension to the TDM pattern may be signaled to the small cell base station 110B by for example having the macro base station 110A signal the small cell base station 110B that the TDM pattern will be extended. This signaling may happen via a network interface, such as X2, Xn, or similar, or the signaling may also use some radio signaling between eNBs.

Alternatively or additionally, the extension to the TDM pattern may be signaled to the small cell base station by for example, having user equipment 114 return to the small cell base station 110B to indicate to the small cell base station 110B that the user equipment 114 needs an extension of the TDM pattern in order to communicate with the macro base station 110A (for example in order to receive the retransmissions and the like), and then the user equipment 114 returns back to the macro base station 110A to receive the retransmission by macro base station 110A. The signaling in the small cell may happen, for instance, via a physical uplink control channel (PUCCH). The indication may be defined in a similar way as scheduling request (SR) signaling (for example, a dedicated resource that the user equipment can use when it needs to indicate the extension of the TDM pattern). This resource may be aligned with the TDM pattern such that the resource is available exactly when the user equipment returns back to small cell to indicate the extension.

Alternatively or additionally, a missing UL transmission in the small cell/base station may be used as an indication that the user equipment 114 is monitoring the macrocell, for example, when user equipment 114 misses an uplink transmission schedule in the small cell, the missed opportunity on the uplink may be used as an indication that user equipment 114 has extended the TDM schedule by for example monitoring the macro base station 110A retransmission. For example, the network may configure a channel quality indicator (CQI) transmission to happen after the gap at 172. If user equipment 114 remains in communication with the macro base station 110A due to TDM pattern extension, user equipment 114 will not be transmitting at 172 the CQI to small cell base station 110B. As such, small cell base station 1108 will detect this lack of CQI transmission by the user equipment 114 at 172 (for example, with discontinuous transmit (DTX) detection). Although the previous describes detecting a missing CQI, other aspects may be detected as well including a missing a sounding reference signal (SRS) transmission, a missing Hybrid automatic repeat request (HARQ) retransmission, or a missing new transmission (such as no response to an uplink grant) can also be used as an indication that user equipment 114 stayed in communication with the macro base station 110A to receive the re-transmission (which was caused by for example, the receive or decode failure) or a new transmission by the macrocell/base station 110A.

Figure 2:
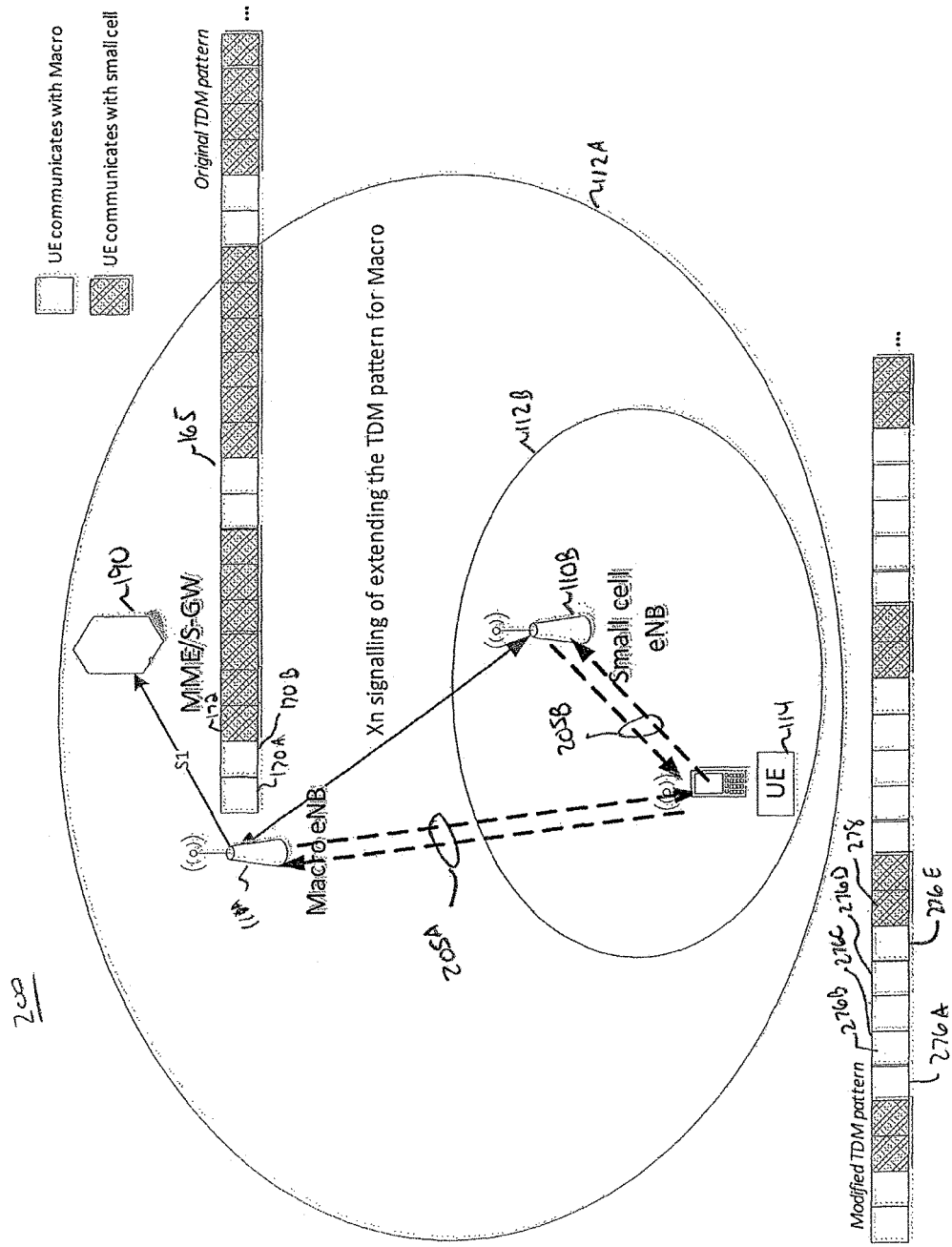

FIG. 2 depicts an example system 200 including user equipment 114 in dual connectivity 205A-B with base stations 110A-B in accordance with a TDM schedule 165. For example, during subframes 170A-B, user equipment 114 may receive, via a single RF receive/transmit chain, from macro base station 110A (for example, to receive data, listen to a PDCCH, and/or the like), and switch the single RF receive/transmit chain to access at 172 small cell base station 110B. However, in some example embodiments, user equipment 114 may need more time with macro base station 110. For example, a failure to receive/decode a transmission from macro base station 110A during 170A-B may, as noted, prompt the user equipment 114 to need more time to receive base station 110A's retransmission.

In some example embodiments, macro base station 110A may send (for example, via an Xn interface) an indication at 210 to small cell base station 110B, and this indication may represent a request or a command to extend the time user equipment 114 is scheduled to receive from macro base station 110A. As such, this indication represents a request to modify TDM pattern 165 into TDM pattern 265, which shows extending the scheduled time at 276A-E, during which user equipment 114 may communication with macro base station 110A to receive for example the retransmission, although the extension may be used for other reasons by user equipment 114. After this time 276A-E, user equipment 114 may resume at 278 access at small cell base station 110B. In some example implementations, the use of 210 and, in particular, Xn signaling may lead to delays on the order of about 5-50 ms. This delay may not be found in some implementations including those described with respect to FIGS. 3-5 described further below.

Figure 3:
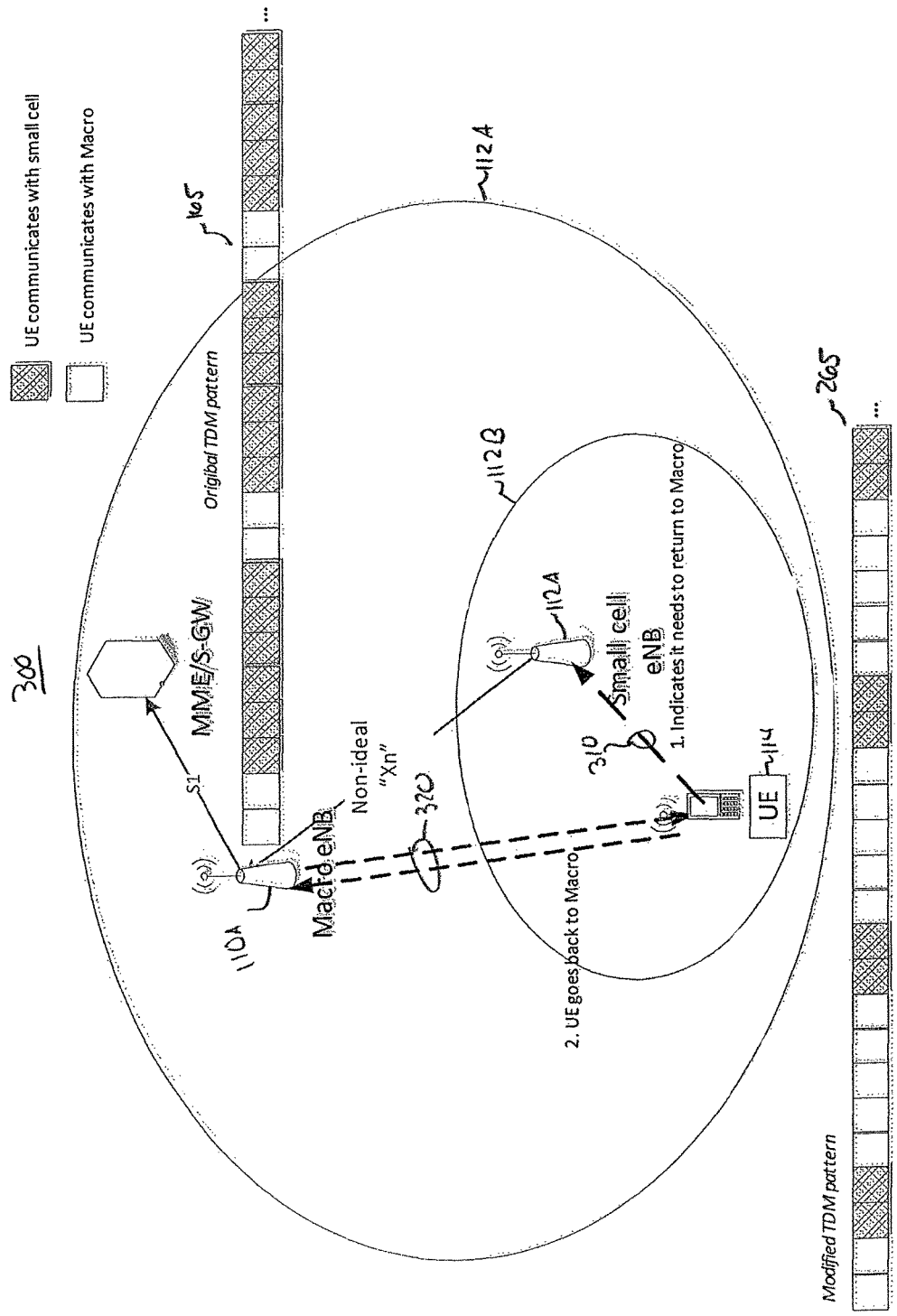

FIG. 3 depicts an example system 300 including user equipment 114 in dual connectivity (for example, in a TDM manner) 205A-B with base stations 110A-B, in accordance with some example embodiments. Unlike FIG. 2, user equipment 114 may send at 310 (for example, via an uplink) an indication to the small cell/base station 110B. This indication may represent a request or a command to extend the time user equipment 114 is scheduled to receive from macro base station 110A. As such, this indication represents a request to modify TDM pattern 165 into TDM pattern 265, so that user equipment 114 can return to base station 110A to receive the re-transmission and/or the like. This extension may correspond to the extension 276A-E, during which user equipment 114 may communication with macro base station 110A. At 278, user equipment 114 may switch its radio to resume access to small cell base station 110B.

Figure 4:
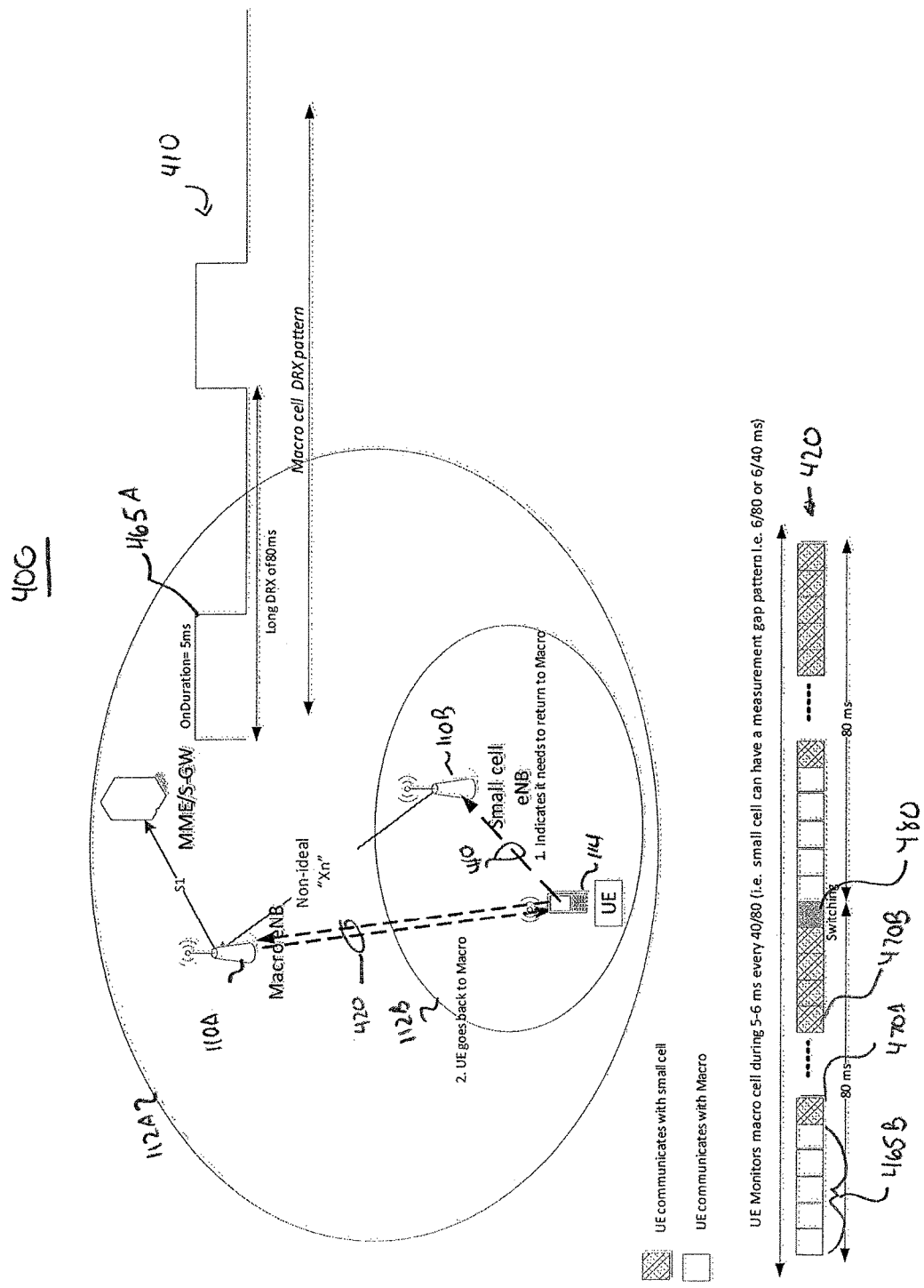

FIG. 4 depicts an example system 400 including user equipment 114 in dual connectivity 205A-B with base stations 110A-B, in accordance with some example embodiments. In the example of FIG. 4, macro base station 110A may be configured with a long discontinuous receive (DRX) pattern 410, and small cell 112B may be configured with a measurement gap pattern 420. These two TDM patterns 410 and 420 may be synchronized, so that on duration 465A of the macro base station 110A is during the active time 465B of the small cell measurement gaps of pattern 420.

In some example embodiments, a basic TDM pattern 420 may be used when user equipment 114 receives data from the small cell/base station 110B. This pattern 420 may provide gaps, such as measurement gaps, during which user equipment 114 can receive/listen to macro base station 110A (for example, listen for about 5-6 ms 465 every 40 or 80 ms). This pattern 420 may, in some example embodiments, allow use of small cell measurement gap handling, such as measurement gaps described in TS 3GPP 36.321, although other standards and types of gaps may be used as well. For example, user equipment 114 may stop receiving and transmitting in the small cell during the gap at 465B and, if no data has been received in the macrocell/base station 110A, the user equipment 114 can return to normal operation at the small cell/small cell base station 110B after the gap 470A, 470B, and so forth. And the handling of missed HARQ ACK/NACKs or retransmissions during the gap may follow the rules defined for measurement gaps.

In some example embodiments, macro base station 110A may be configured with a normal DRX having an on duration of about for example 5 ms and a long DRX cycle of 40 or 80 ms, although other times may be used as well. When macro base station 110A schedules user equipment 114 (for example, via a PDCCH sent to the user equipment), the reception of PDCCH may start a DRX inactivity timer, a HARQ round trip time (RTT) timer, and/or a DRX retransmission timer if needed. Therefore, user equipment 114 may stay longer in the macro base station 110A. This may be indicated to the small cell/small base station 110B, so that the small cell/small base station 110B stops scheduling and continues after the macro base station 110A has finished scheduling (and DRX timers in the macrocell have expired—which may be indicated to the small cell as well). An example of this is illustrated in FIG. 5.

Figure 5:
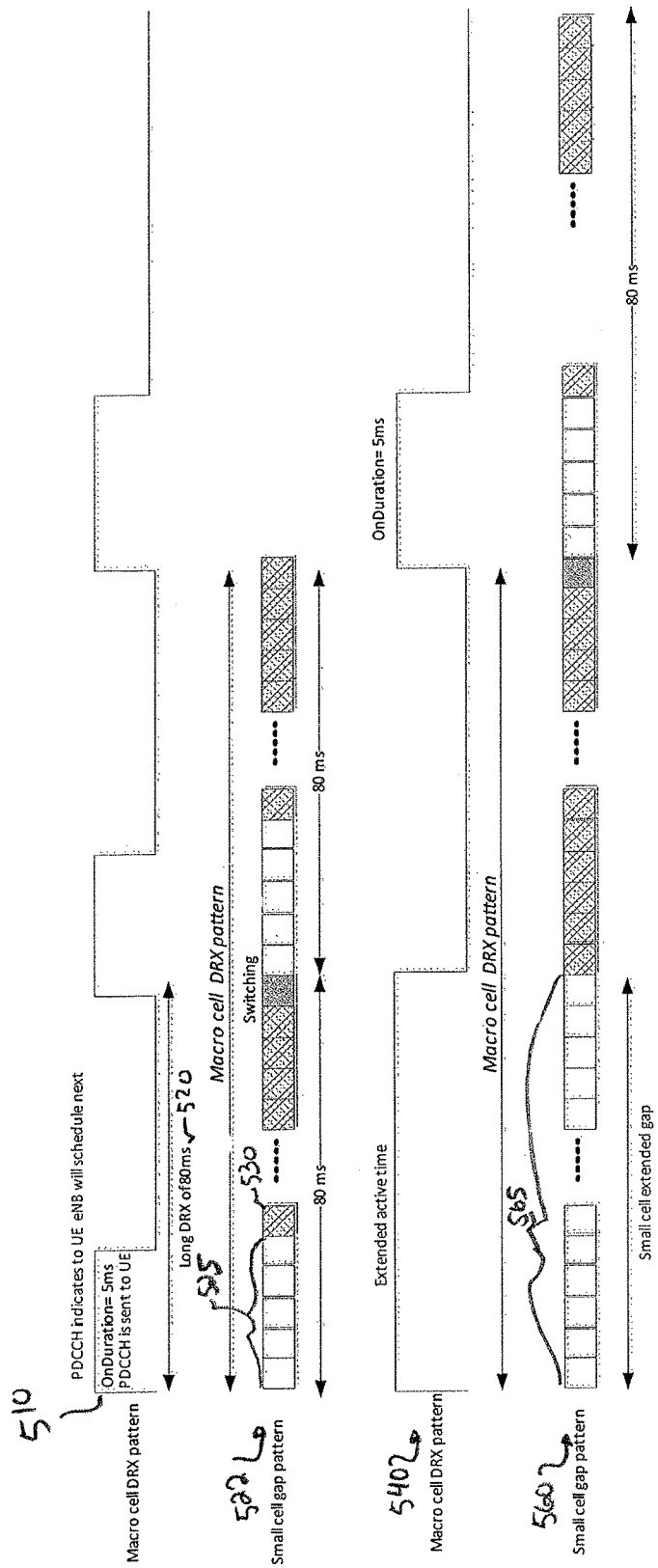
FIG. 5 depicts an example pattern for dual connectivity, in accordance with some exemplary embodiments.

Referring to FIG. 5, macro base station 110A may be configured with a DRX pattern enabling user equipment 114 in small cell 112B/small cell base station 110B to listen to macrocell 112A/macro base station 110A. For example, the DRX pattern may have an on duration of 5 ms 510, time during which macro base station 110A may send to user equipment 114 the PDCCH. The PDCCH may indicate that macro base station 110A will schedule the user equipment 114 next. The DRX pattern may be a long DRX cycle configuration 520. The small cell base station 110B may be in synchrony with the on duration 510, so small cell base station 110B follows a TDM pattern 522 having measurement gaps 525 synchronized to on duration 510, during which time user equipment 114 can listen to macro base station 110A (and, as such, is not able to receive from small cell base station 110B). In turn, the small cell/base station 110B may follow the measurement gaps-like pattern (as the small cell/base station knows when user equipment 114 listens to the macrocell and is not able to receive from the small cell). When the macro base station 110A schedules user equipment 114 and the macro DRX pattern 540 extends the active time (for example, due to the inactivity timer or DRX retransmission timer running) beyond the length of the (dual connectivity) gap, the small cell gap pattern 560 is extended as depicted at 565. After the scheduling is completed, the original long DRX configuration may be applied in the macro base station 110A and the measurement/dual connectivity gap pattern may be applied in the small base station 110B.

The macro base station 110A may know some time before the on duration starts that macro base station 110A is going to be scheduling user equipment 114. The macro base station 110A may thus indicate this in advance as well to the small base station 110B via for example, an Xn interface or a modified/enhanced X2 interface connecting the macro base station 110A and the small macro base station 110B. This advance notice may account for some additional delay in the Xn interface (for example, if the Xn interface delay is, for instance, 6 ms, macro eNB 110A may send the indication at least 6 ms before the end of the gap so that small macro base station 110B knows it before it would start scheduling again). Moreover, when macro base station 110A stops scheduling, macro base station 110A may also indicate that to small base station 110B. The indication may include when (for example, a time instant, such as a frame number and a subframe number) small cell can resume scheduling. Alternatively or additionally, user equipment 114 may indicate to small base station 110B when user equipment 114 has received data or other information from macro base station 110A macrocell and will not monitor small cell base station 110B for a given time. User equipment 114 may also indicate to the small base station 110B, when it will again monitor small base station 110B.

In some example embodiments, user equipment 114 may signal (at both sides macro and small cell) when it leaves/returns. In some example embodiments, a TDM pattern may be implemented based on where user equipment 114 indicates it currently spends most of the time. For example, this may result in switching between two TDM patterns (for example, a 6 ms out of 40 ms pattern and switching whether the user equipment spends the shorter portion in the macro and longer portion in small cell or vice versa). In some example embodiments, the macro base station 110A may indicate via scheduling (for example, PDCCH) whether the transmission is urgent/control and thus the user equipment should stay to receive the retransmission even if the gap ends. For other transmissions, the user equipment can wait for the next gap. In some example embodiments, no indication is signaled, but the small cell/base station 110B may end up scheduling the user equipment 114 unnecessarily, so the user equipment 114 continues to communicate with the macrocell/ macro base station 110A longer than the gap pattern would allow.

Without in any way limiting the scope, interpretation, or application of the claims appearing below, a technical effect of one or more of the example embodiments disclosed herein may include the user equipment's reception of a re-transmission is not delayed excessively due to the dual connectivity TDM pattern between macro and small cell. If the user equipment would need to wait until the next opportunity to communicate with for example the macrocell/ base station according to the pattern, it could take tens of milliseconds or even longer, depending on the pattern, before the retransmission would be received or communication otherwise continued. This may result in longer delays in receiving for example important control signaling, which may be detrimental to the overall system (for example, a delayed handover command may cause the user equipment's radio link to fail).

Before providing additional description regarding the dual connectivity mobility disclosed herein, the following provides additional details regarding example implementations of some of the devices.

The base stations 110A-B may, in some example embodiments, be implemented as an evolved Node B (eNB) type wireless access points, such as base stations consistent with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). The base station may also be configured as a small cell base station, such as a femtocell base station, a home evolved node B base station, a picocell base station, a WiFi access point, and/or a wireless access point configured in accordance with other radio access technologies as well. Moreover, the base stations may be configured to provide carrier aggregation to a given user equipment. For example, the dual connections may correspond to carrier aggregation carriers, such as a primary carrier or cell (PCell) provided by a macro eNB base station and another carrier by a small cell or secondary cell (SCell).

The user equipment, such as user equipment 114, may be implemented as a mobile device and/or a stationary device. The user equipment are often referred to as, for example, mobile stations, mobile units, subscriber stations, wireless terminals, tablets, smart phones, or the like. A user equipment may be implemented as, for example, a wireless handheld device, a wireless plug-in accessory, a wireless transceiver configured in a stationary device, a wireless transceiver configured in a mobile device and/or the like. In some cases, user equipment may include a processor, a computer-readable storage medium (e.g., memory, storage, and the like), a radio interface(s), and/or a user interface. In some example embodiments, the user equipment may be configured to receive a TDM configuration defining when to switch between cells/base stations, and/or the like.

Although FIGS. 1-4 depict a certain quantity of devices and a certain configuration, other quantities and configurations may be used as well.

FIG. 6 depicts a process 600 for extending the TDM pattern, in accordance with some example embodiments. The description of FIG. 6 also refers to FIGS. 1-5.

At 610, the user equipment 114 may switch between a first carrier associated with a first base station and a second carrier associated with a second base station, in accordance with some example embodiments. This switching may, in some example embodiments, be performed based on at least a configuration defining when to perform the switching. For example, user equipment 114 may switch between macro base station 110A and small cell base station 110B in accordance with a schedule, such as a TDM pattern defining when (for example, what subframes) the user equipment 114 is schedule to access the macro base station 110A and the small cell base station 110B.

At 620, an indication may be provided to request/indicate extending a time allocated by the schedule. For example, user equipment 114 may want to remain at base station 110A to receive a transmission or retransmission, but the schedule, such as the TDM pattern, may require the user equipment 114 to return to small cell base station 110B. When this is the case, the macrocell base station 110A may send an indication or request to small cell base station 110B. This request/indication informs that small cell base station 110B that user equipment 114 is extending the time scheduled at macro base station 110A. Alternatively or additionally, user equipment 114 may send the indication or request by briefly accessing the small cell base station 110B (for example, by switching its transceiver to a carrier associated with the small cell base station) and notifying the small cell base station 110B before returning and resuming reception and access to macro base station 110A to send the indication/request to the second base station and resumes access to the first carrier. Alternatively or additionally, the user equipment may signal its intent to remain at the macro base station by failing to transmit to the small call base station 110B (for example, by failing to provide a channel quality indictor, a sounding reference signal transmission, a response (ACK/NACK) to a hybrid automatic repeat request (re)transmission, a response to an uplink grant, and/or the like).

Figure 7:
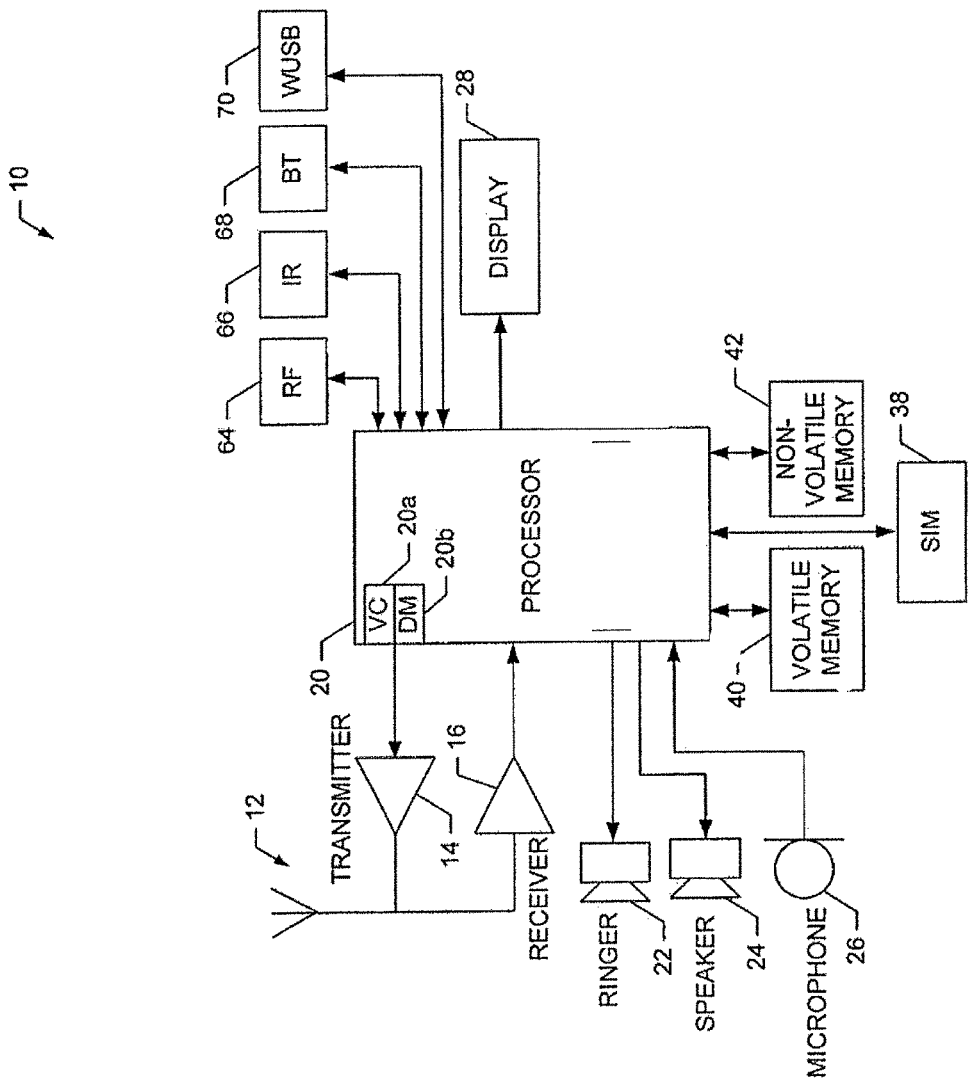
FIG. 7 depicts an example of a user equipment, in accordance with some exemplary embodiments.

FIG. 7 illustrates a block diagram of an apparatus 10, which can be configured as user equipment in accordance with some example embodiments.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example, a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 7 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example, Institute of Electrical and Electronics Engineers (IEEE) 802.11, 802.16, and/or the like. In addition, these signals may include speech data, user generated data, user requested data, control data and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as for example, Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example, Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example, LTE Advanced and/or the like as well as similar wireless communication protocols that may be subsequently developed. Further, the apparatus may be capable of operating in accordance with carrier aggregation.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example, a web browser. The connectivity program may allow the apparatus 10 to transmit and receive web content, such as for example, location-based content, according to a protocol, such as for example, wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example, a keypad 30 (which can be a virtual keyboard presented on display 28 or an externally coupled keyboard) and/or other input devices.

As shown in FIG. 7, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as for example, an infrared (IR) transceiver 66, a Bluetooth (BT) transceiver 68 operating using Bluetooth wireless technology, a wireless universal serial bus (USB) transceiver 70, and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example, within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as for example, IEEE 802.11 techniques, IEEE 802.15 techniques, IEEE 802.16 techniques, and/or the like.

The apparatus 10 may comprise memory, such as for example, a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example, an international mobile equipment identification (IMEI) code, capable of uniquely identifying apparatus 10. The functions may include one or more of the operations disclosed herein with respect to the user equipment (for example, indicating that the user equipment is extending the scheduled time at a given cell and/or the like). The memories may comprise an identifier, such as for example, an international mobile equipment identification (IMEI) code, capable of uniquely identifying apparatus 10.

Figure 8:
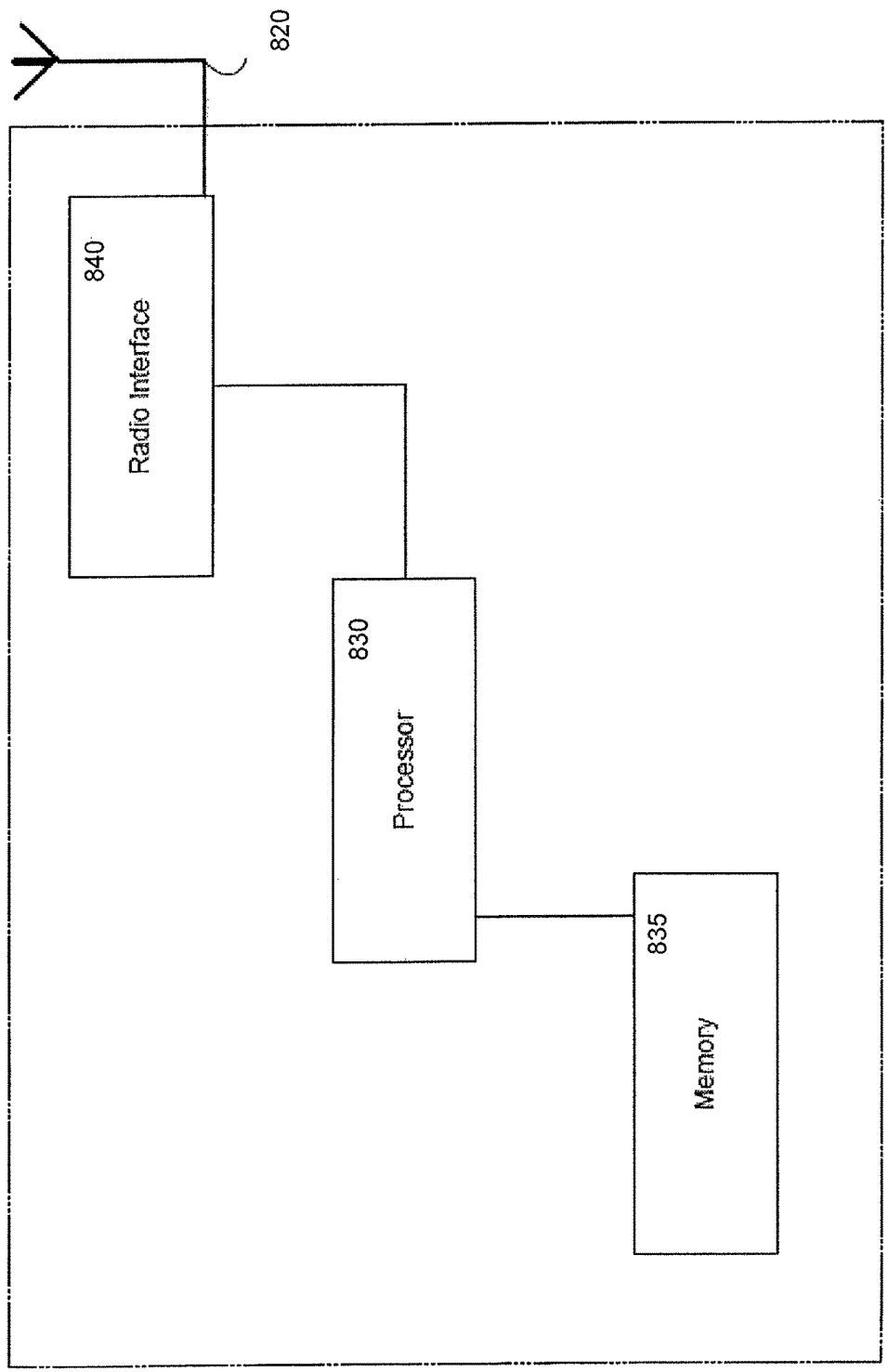
FIG. 8 depicts an example of a base station, in accordance with some exemplary embodiments.

FIG. 8 depicts an example implementation of a network node, such as a base station, access point, and/or any other type of node. The network node may include one or more antennas 820 configured to transmit via a downlink and configured to receive uplinks via the antenna(s) 820. The network node may further include a plurality of radio interfaces 840 coupled to the antenna 820. The radio interfaces may correspond one or more of the following: Long Term Evolution (LTE, or E-UTRAN), Third Generation (3G, UTRAN, or high speed packet access (HSPA)), Global System for Mobile communications (GSM), wireless local area network (WLAN) technology, such as for example 802.11 WiFi and/or the like, Bluetooth, Bluetooth low energy (BT-LE), near field communications (NFC), and any other radio technologies. The radio interface 740 may further include other components, such as filters, converters (for example, digital-to-analog converters and/or the like), mappers, a Fast Fourier Transform (FFT) module, and/or the like, to generate symbols for a transmission via one or more downlinks and to receive symbols (for example, via an uplink). The network node may further include one or more processors, such as processor 830, for controlling the network node and for accessing and executing program code stored in memory 835. In some example embodiments, memory 835 includes code, which when executed by at least one processor causes one or more of the operations described herein with respect to a base station.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as for example, a computer or data processor, with examples depicted at FIGS. 6 and 7. A computer-readable medium may comprise a non-transitory computer-readable storage medium that may be any media that can contain or store the instructions for use by or in connection with an instruction execution system, apparatus, or device, such as for example, a computer. Moreover, some of the embodiments disclosed herein include computer programs configured to cause methods as disclosed herein (see, for example, FIGS. 1-5, process 600, and/or the like).

Without in any way limiting the scope, interpretation, or application of the claims appearing below, a technical effect of one or more of the example embodiments disclosed herein may include enhanced operation under dual-connectivity scenarios and/or reduced delays of a user equipment's reception of a re-transmission due to the dual connectivity TDM pattern between a macrocell and a small cell.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method comprising:
switching, by a user equipment in dual connectivity with a first base station and a second base station, between a first carrier associated with the first base station serving a macrocell and a second carrier associated with the second base station serving a small cell, wherein the switching is performed based on at least a time domain multiplexing pattern defining an established configuration indicating the switching back and forth between the first carrier and the second carrier in dual connectivity, wherein the time domain multiplexing pattern comprises a first subframe interval during which the user equipment is in communication with the first base station, and wherein the time domain multiplexing pattern further comprises a second subframe interval during which the user equipment is in communication with the second base station; and
modifying, by the user equipment in response to at least one of a request or an indication, the time domain multiplexing pattern, wherein the modified time domain multiplexing pattern comprises an increase in a first number of subframes of the first subframe interval and a decrease in a second number of subframes of the second subframe interval, and wherein the increase in the first number of subframes provides for an extension of time during which the user equipment is in communication with the first base station.

2. The method of claim 1, wherein the macrocell comprises a primary cell and/or an anchoring cell, and the small cell comprises a secondary cell and/or an assisting cell.

3. The method of claim 1, wherein the user equipment accesses the first carrier and the second carrier using a single transceiver.

4. The method of claim 1, wherein the at least one of a request or indication is sent
by the first base station to at least the second base station.

5. The method of claim 1, wherein modifying the time domain multiplexing pattern by the user equipment in response to at least one of a request or an indication further comprises:
modifying the time domain multiplexing pattern by the user equipment in response to sending, by the user equipment, the at least one of a request or an indication to at least the second base station.

6. The method of claim 5, wherein the user equipment accesses the second carrier to send the at least one of the request or the indication to the second base station and resumes access to the first carrier.

7. The method of claim 1, wherein at least one of a request or an indication comprises accessing, by the user equipment during the second subframe interval, the first base station.

8. The method of claim 7, wherein the at least one of the request or the indication comprises failing to provide, by the user equipment during the second subframe interval, the second base station with an expected transmission, wherein the expected transmission includes a channel quality indictor, a sounding reference signal transmission, a response to a hybrid automatic repeat request retransmission, or a response to an uplink grant.

9. The method of claim 1, wherein at least one of a request or an indication is sent, in response to at least one of a transmission from the first base station the first base station has additional information to transmit to, or receive from, the user equipment.

10. An apparatus comprising:
at least one processor; and
at least one memory including computer program code, the at least one memory and the computer program code configured to, with the at least one processor, cause the apparatus to at least:
switch, by the apparatus in dual connectivity with a first base station and a second base station, between a first carrier associated with the first base station serving a macrocell and a second carrier associated with the second base station serving a small cell, wherein the switch is performed based on at least a time domain multiplexing pattern defining an established configuration indicating the switching back and forth between the first carrier and the second carrier in dual connectivity, wherein the time domain multiplexing pattern comprises a first subframe interval during which the user equipment is in communication with the first base station, and wherein the time domain multiplexing pattern further comprises a second subframe interval during which the user equipment is in communication with the second base station; and
modify, in response to at least one of a request or an indication, the time domain multiplexing pattern, wherein the modified time domain multiplexing pattern comprises an increase in a first number of subframes of the first subframe interval and a decrease in a second number of subframes of the second subframe interval, and wherein the increase in the first number of subframes provides for an extension of a time during which the user equipment is in communication with the first base station.

11. The apparatus of claim 10, wherein the macrocell comprises a primary cell and/or an anchoring cell, and the small cell comprises a secondary cell and/or an assisting cell.

12. The apparatus of claim 10, wherein the apparatus accesses the first carrier and the second carrier using a single transceiver.

13. The apparatus of claim 10, wherein the first base station sends at least one of a request or an indication to at least the second base station.

14. The apparatus of claim 10, wherein the apparatus is further caused to at least send at least one of a request or an indication to at least the second base station.

15. The apparatus of claim 14, wherein the apparatus accesses the second carrier to send the at least one of the request or the indication to the second base station and resumes access to the first carrier.

16. The apparatus of claim 10, wherein at least one of a request or an indication is indicated by the apparatus continuing to access the first base station during the second subframe interval.

17. The apparatus of claim 10, wherein the at least one of the request or the indication is indicated by the apparatus failing to provide the second base station with an expected response during the second subframe interval, wherein the expected response includes at least one of a channel quality indictor, a response to a sounding reference signal transmission, a response to a hybrid automatic repeat request retransmission, or a response to an uplink grant.

18. The apparatus of claim 10, wherein at least one of a request or an indication is sent, in response to at least one of a transmission from the first base station has failed or the first base station has additional information to transmit to, or receive from, the apparatus.

\* \* \* \* \*